US006868133B2

(12) United States Patent
Hicks et al.

(10) Patent No.: US 6,868,133 B2
(45) Date of Patent: Mar. 15, 2005

(54) METHOD AND SYSTEM FOR OVERLOADED ARRAY PROCESSING

(75) Inventors: James E. Hicks, Blacksburg, VA (US); Robert J. Boyle, Pearisburg, VA (US); Saffet Bayram, North Richland Hills, TX (US); Jeffrey H. Reed, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 837 days.

(21) Appl. No.: 09/858,316

(22) Filed: May 15, 2001

(65) Prior Publication Data

US 2001/0048725 A1 Dec. 6, 2001

Related U.S. Application Data

(60) Provisional application No. 60/204,117, filed on May 15, 2000.

(51) Int. Cl.[7] .............................................. H04L 27/06
(52) U.S. Cl. ...................................... 375/341; 714/792
(58) Field of Search ................................ 375/341, 262, 375/265, 340; 714/792, 794, 795

(56) References Cited

U.S. PATENT DOCUMENTS

| 4,884,272 A | 11/1989 | McConnell | 371/43 |
| 5,406,585 A * | 4/1995 | Rohani et al. | 375/341 |
| 5,862,192 A | 1/1999 | Huszar et al. | 375/347 |
| 2002/0044614 A1 * | 4/2002 | Molnar et al. | 375/346 |

FOREIGN PATENT DOCUMENTS

| EP | 0 593 404 A1 | 4/1994 | H03M/13/00 |
| WO | WO 99/65160 | 12/1999 | H04B/7/08 |

OTHER PUBLICATIONS

Fujii, Masaaki, "Path Diversity Reception Using SMI Steering Vector Arrays and Multi–Trellis Viterbi Equalizer", Universal Personal Communications, 1998, ICUPC '98, IEEE 1998 International Conference on Florence, Italy Oct. 5–9, 1998, pp. 911–915.

International Search Report dated Mar. 14, 2002 for PCT/US01/15521 filed May 14, 2001.

* cited by examiner

*Primary Examiner*—Khai Tran
*Assistant Examiner*—David B. Lugo
(74) *Attorney, Agent, or Firm*—Baker Botts L.L.P.

(57) ABSTRACT

According to the present invention, a method and system for array processing are disclosed. Signals transmitting a symbol set are received. A dominant signal set for each signal, which includes dominant signals that interfere with the signal, is determined. A trellis, which includes paths that represent possible symbol sets, is constructed from the dominant signal sets. An optimal path from the trellis is selected, and the symbol set represented by the optimal path is determined.

21 Claims, 5 Drawing Sheets

METHOD AND SYSTEM FOR OVERLOADED ARRAY PROCESSING

RELATED APPLICATION

This application claims the benefit of U.S. provisional application Ser. No. 60/204,117, filed May 15, 2000, entitled *SPATIALLY REDUCED SEARCH JOINT DETECTION FOR OVERLOADED ARRAY PROCESSING.*

TECHNICAL FIELD OF THE INVENTION

This invention relates generally to the field of wireless communications and more specifically to a method and system for overloaded array processing.

BACKGROUND OF THE INVENTION

Many antenna arrays such as airborne antenna arrays have a limited number of antenna elements due to size and weight restrictions, but receive multiple signals due to their high altitude and resulting large field of view. An antenna array becomes overloaded when the number of signals received by the array exceeds the number of antenna elements of the array. Techniques for overloaded array processing, however, require a large amount of computational power and time. Consequently, overloaded array processing has posed challenges in the field of wireless communications.

SUMMARY OF THE INVENTION

While known approaches have provided improvements over prior approaches, the challenges in the field of wireless communications have continued to increase with demands for more and better techniques having greater effectiveness. Therefore, a need has arisen for a new method and system for overloaded array processing.

In accordance with the present invention, a method and system for overloaded array processing are provided that substantially eliminate or reduce the disadvantages and problems associated with previously developed systems and methods.

According to one embodiment of the present invention, a method for array processing is disclosed. Signals transmitting a symbol set are received. A dominant signal set for each signal is determined. The dominant signal set for a signal includes dominant signals that interfere with the signal. A trellis is constructed from the dominant signal sets. The trellis includes paths that represent possible symbol sets. An optimal path from the trellis is selected, and the symbol set represented by the optimal path is determined.

Certain embodiments of the invention may provide numerous technical advantages. A technical advantage of one embodiment is that a spatial-trellis is used to describe possible symbol sets transmitted by spatially diverse signals. The trellis may significantly reduce the required search with little performance degradation over the optimal solution. Another technical advantage of one embodiment is that a sparsity pattern is used to identify signals that produce dominant interference and to eliminate the rest of the signals. The sparsity pattern may provide an efficient method for constructing a trellis of reduced complexity, thus decreasing computational time and power. Another technical advantage of one embodiment is that an efficient search process is used to locate an approximate least cost path through the trellis. The least cost path identifies an optimal symbol set.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 8 of the drawings, like numerals being used for like and corresponding parts of the various drawings.

Figure 1:
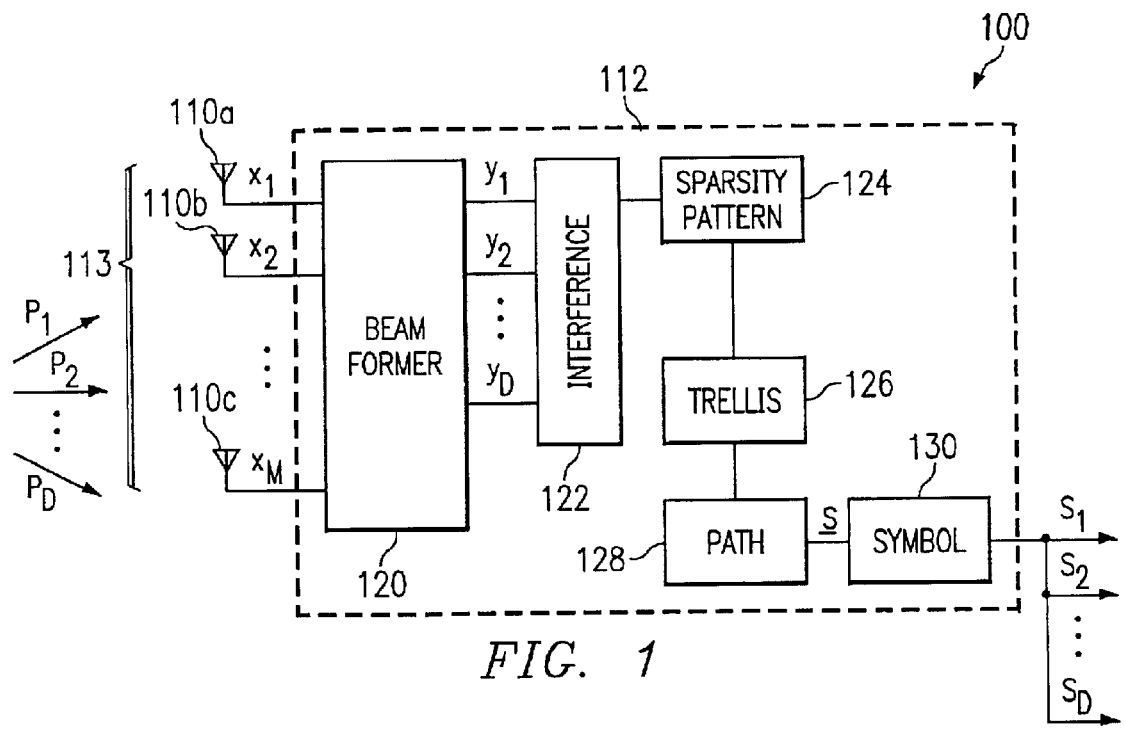
FIG. 1 is a block diagram illustrating a system for array processing.

FIG. 1 is a block diagram illustrating a system 100 for array processing. System 100 includes an antenna array 113 of radius R that has antenna elements 110 that receive signals $p_1, p_2, \ldots, p_D$. Signals $p_d$ transmit symbols to system 100, which processes the signals $p_d$ to extract the symbols. Signals $p_d$ may be, for example, co-channel, complex pulse-amplitude modulated (PAM) signals that are symbol-synchronous, or have perfectly aligned symbols. The number D of signals $p_d$ received by antenna elements 110 may be greater than the number M of antenna elements 110 such that antenna array 113 is overloaded. Antenna elements 110 generate antenna data $x_1, x_2, \ldots, x_m, \ldots, x_M$ in response to detecting signals $p_d$.

The relationship between the antenna data and symbols for system 100 is described by Equation (1):

$$\underline{x}[n] = A\underline{s}[n] + \underline{z}[n] \tag{1}$$

where vector $\underline{s}[n] = [s_1[n]\, s_2[n] \ldots s_D[n]]^T$ is a D×1 vector of the nth symbol set transmitted by the signals, and $s_d[n]$ is the symbol set transmitted by signal $p_d$. Each $s_d[n]$ is independent and drawn equally likely from an alphabet of symbols. Vector $\underline{x}[n] = [x_1[n]\, x_2[n] \ldots x_M[n]]$ is an M×1 vector of antenna data generated in response to the nth received signals. Matrix A is the composite array response for the signals, where the dth column of matrix A is the steering vector for the dth signal. If signals $p_d$ are at zero elevation. If the array has a circular geometry then the steering vector for antenna array 113 is given by Equation (2):

$$\underline{a}(\theta_d) = [\alpha_1 \ldots \alpha_M]^T,\ \alpha_m = \exp\left(-jK_R\sin\left(\theta_d - \frac{2\pi(m-1)}{M}\right)\right) \tag{2}$$

where the constant $K_R = 2\pi R/\lambda$, angle $\theta_d$ is the azimuthal angle of arrival, $\lambda$ is the wavelength of the carrier frequency, and T represents vector transpose. Vector $\underline{z}[n]$ is an M×1 vector representing temporally uncorrelated noise with zero mean and autocorrelation $\Phi_{zz}=E[\underline{z}[n]\underline{z}[n]^H]$, where H represents the Hermetian transpose, or the conjugate-transpose, of a matrix.

System 100 utilizes a modified form of a joint maximum likelihood (JML) criterion to identify the most likely symbol set transmitted by signals $p_d$. The modified form represents a cost function, which is optimized to determine the most likely symbol set. If no inter-symbol interference is present, a joint maximum likelihood (JML) criterion for detecting signals $p_d$ impinging on antenna array 113 is described by Equation (3):

$$\hat{s}[n] = \underset{\underline{s} \in A^{D_u}}{\operatorname{argmin}}(x[n] - A\underline{s})^H \Phi_{zz}^{-1}(x[n] - A\underline{s}) \qquad (3)$$

The JML criterion is modified to produce a cost function. Equation (3) is simplified by expanding products and dropping terms independent of the optimization to yield Equation (4):

$$\hat{s}[n] = \operatorname{argmin}\{\underline{s}^H A^H \Phi_{zz}^{-1} A \underline{s} - 2Re\{(\Phi_{zz}^{-1} A \underline{s})^H \underline{x}\}\} \qquad (4)$$

where Re represents the real part of a number. A D×D matrix H and D×1 vector $\underline{y}$ are defined by Equations (5):

$$H^H H = A^H \Phi_{zz}^{-1} A, \qquad (5)$$
$$H^H \underline{y} = A^H \Phi_{zz}^{-1} \underline{x}$$

Matrix H may be written as a spectral square root described by Equation (6):

$$H = (A^H \Phi_{zz}^{-1} A)^{(1/2)} \qquad (6)$$

Matrix H may be used as an interference matrix that describes the energy that one signal receives from other signals. Matrix H may be selected such that the interference represented by each row of matrix H is concentrated.

Equation (4) is rewritten as a cost function as defined by Equation (7):

$$\hat{s}[n] = \operatorname{arg}_{\underline{s}} \min \|\underline{y} - H\underline{s}\|^2 \qquad (7)$$
$$= \operatorname{arg}_{\underline{s}} \min \sum_{d=1}^{D_s} |y[d] - \hat{y}[d]|^2$$

where $\underline{h}[d]$ is the dth row of H, and $y[d]=\underline{h}[d]\underline{s}$.

Vector $\underline{y}$ is selected to complete the square of the cost function as described by Equation (7) such that when the quantities on the right side of Equation (7) and the matrix H are known, for example, vector $\underline{y}$ may be defined by Equation (8):

$$\underline{y} = ((H^H)^{\mp} A^H \Phi_{zz}^{-1}) \underline{x} = W \underline{x} \qquad (8)$$

where $\mp$ represents the penrose psuedo-inverse of a matrix.

Figure 2:
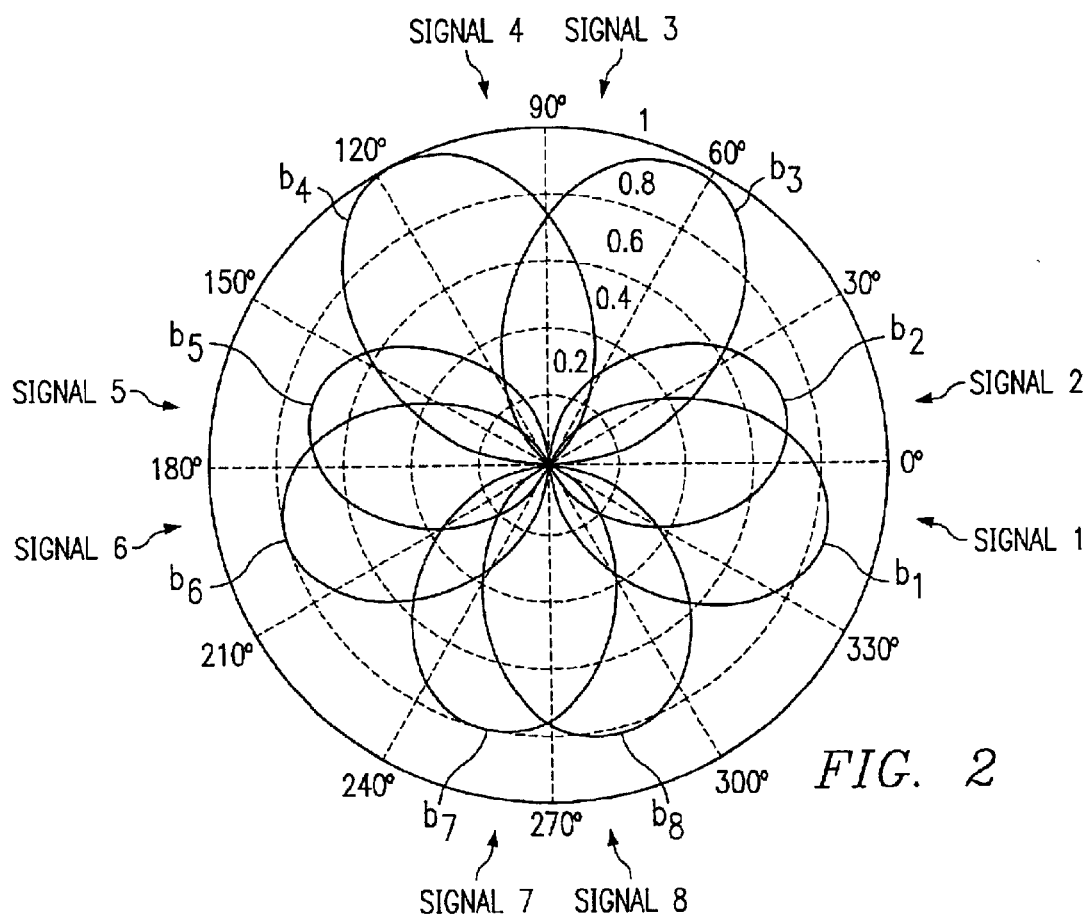
FIG. 2 illustrates beams formed from eight signals impinging on five antenna elements.

A module set 112 uses Equations (5) through (8) to process antenna data $x_m$ to identify the symbol sets $\underline{s}[n]$ that are communicated by the signals $p_d$. The modules of module set 112 may include hardware, software, or any suitable configuration of hardware and software. Module set 112 includes a beam former module 120, an interference module 122, a sparsity pattern module 124, a trellis module 126, a path module 128, and a symbol module 130. Beam former module 120 applies a beam former matrix W, as defined by Equation (8), to antenna data $x_m$ to yield beam outputs $y_d$. Matrix W is a multi-input, multi-output (MIMO) beamformer matrix since each row of matrix W performs an implicit beamforming operation and all rows together preserve the maximum-likelihood criterion. For certain antenna arrays, matrix W focuses the dth beam on the dth user such that every user has dominant energy in at least one beam, thus reducing the complexity of overloaded array processing. A representation of the beams is illustrated in FIG. 2. FIG. 2 illustrates beams $b_1, b_2, \ldots, b_8$ formed from eight signals $p_d$ impinging on five antenna elements 110. The angles of arrival for signals $p_1, p_2, \ldots, p_8$ are 12°, 64°, 115°, 171°, 186°, 261°, 278°, and 353°, respectively.

Figure 3:
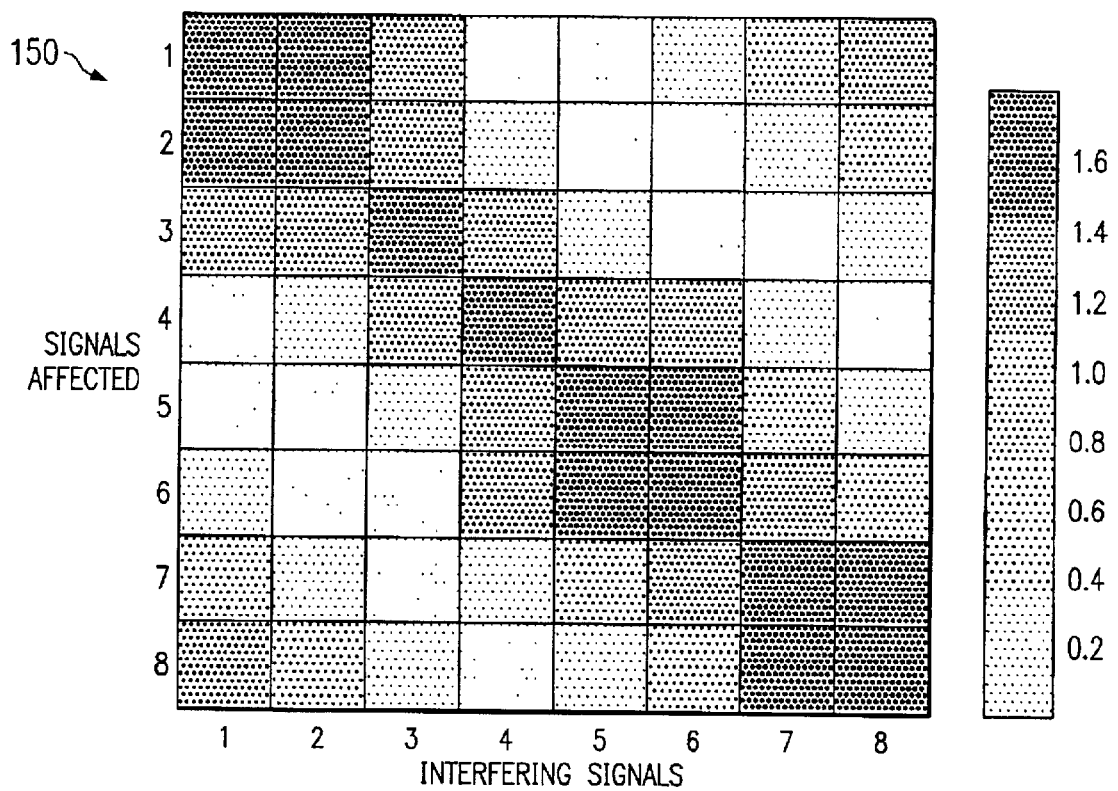
FIG. 3 is an interference diagram illustrating interference that each signal of FIG. 2 experiences from the other signals.

Interference module 122 uses interference matrix H, as defined by Equation (5), and beam outputs $y_k$ to determine interference among signals $p_d$. FIG. 3 is an interference diagram 150 constructed from matrix H, which illustrates interference that each signal $p_d$ of FIG. 2 experiences from the other signals. The rows of interference diagram 150 represent the energy that an affected signal receives from interfering signals, and the columns represent the interfering signals. For example, the first row represents the energy that signal $p_1$ receives from signals $p_1, p_2, \ldots, p_8$. Interference diagram 150 indicates that signal $p_1$ receives the most energy from itself and from neighboring signals $p_2$ and $p_8$.

Sparsity pattern module 124 generates a sparsity pattern from interference diagram 150. The sparsity pattern is a matrix of ones and zeros, where the ones represent dominant signals, or signals that produce interference with high levels of energy, and the zeros represent nondominant signals. The rows of the sparsity pattern represent the signals affected by the interfering signals, and the columns represent the interfering signals. The dominant signals from an affected signal form a dominant signal set U for that signal.

Figure 4:
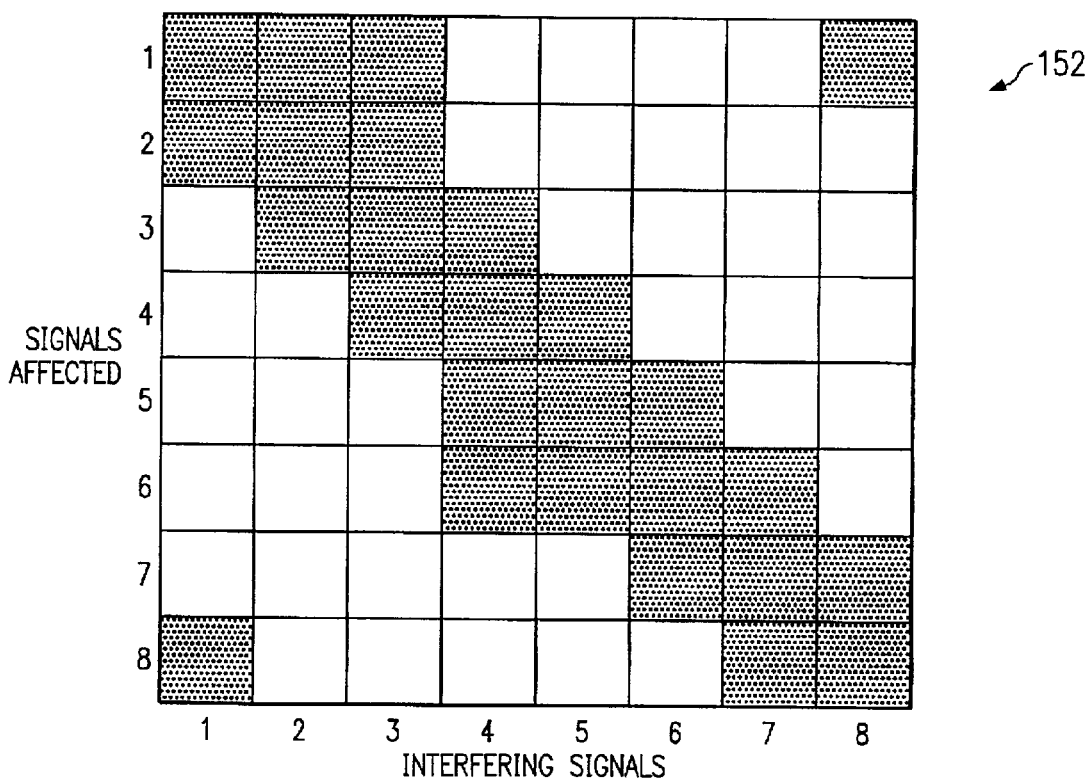
FIG. 4 is a sparsity pattern for the interference diagram of FIG. 3.

An example of a sparsity pattern 152 for interference diagram 150 is illustrated in FIG. 4. The rows of sparsity pattern 152 correspond to rows of interference diagram 150, and the columns of sparsity pattern 152 correspond to the columns of interference diagram 150. The dominant signal set U for signal $p_1$, according to sparsity pattern 152, is U={$s_1, s_2, s_3, s_8$}. Dark squares represent ones, and white squares represent zeros. For each signal, the sparsity pattern selects the dominant signals that interfere most with the signal, and eliminates the nondominant signals. Thus, the sparsity pattern reduces complexity, allowing for more efficient array processing.

If an optimal sparsity pattern cannot be readily determined, a sub-optimal sparsity pattern may be calculated according to a ratio RP of a desired signal's power in the beam former output y[d] to the power of the signals outside the dominant signal set. The ratio RP may be defined by Equation (9):

$$RP = \frac{E[|h[d, d]s[d]|^2]}{E\left[\left|\sum_{u \in U[d]} h[d, u]s[u]\right|^2\right]} = \frac{|h[d, d]|^2}{\sum_{u \in U[d]} |h[d, u]|^2} \qquad (9)$$

where E represents the expected value. The sparsity pattern is generated by selecting the smallest number of contiguous signals that satisfy a predetermined ratio RP for each affected signal.

Figure 5:
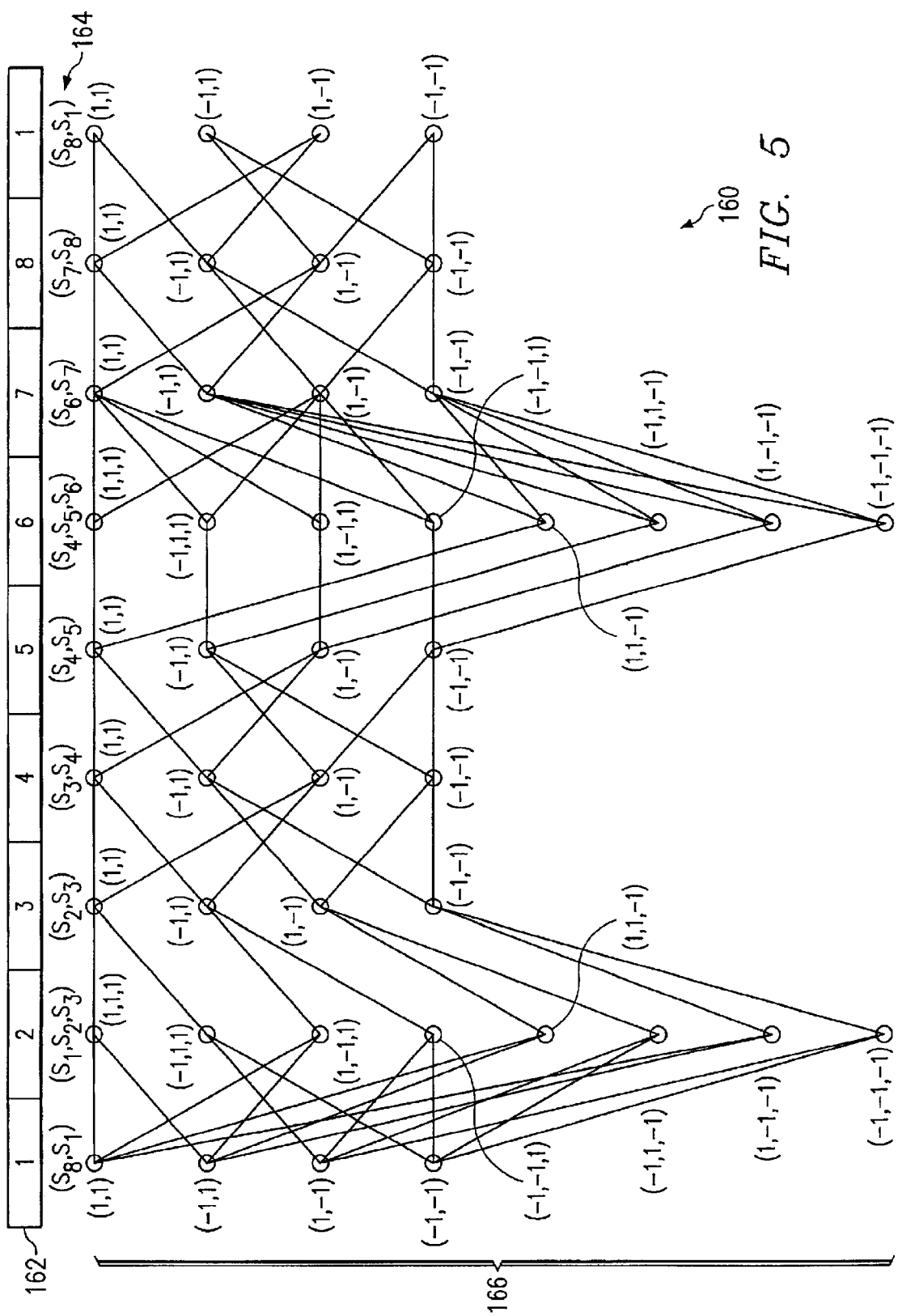
FIG. 5 is a trellis generated from the sparsity pattern of FIG. 4.

Trellis module 126 generates a trellis from the sparsity pattern. A trellis represents possible symbol sets. FIG. 5 illustrates a spatial trellis 160 generated from sparsity pattern 152. A method for generating trellis 160 from sparsity pattern 152 is described in more detail in connection with FIG. 7. Path module 128 searches trellis 160 to determine an optimal path of trellis 160 that optimizes the cost function as defined by Equation (7). The optimal path of trellis 160 represents a most likely symbol set s[n] transmitted by signals $p_d$. Symbol module 130 extracts the symbol set s[n] from the optimal path. A method for determining the optimal path and extracting the symbol set is described in more detail in connection with FIGS. 6 through 8.

Figure 6:
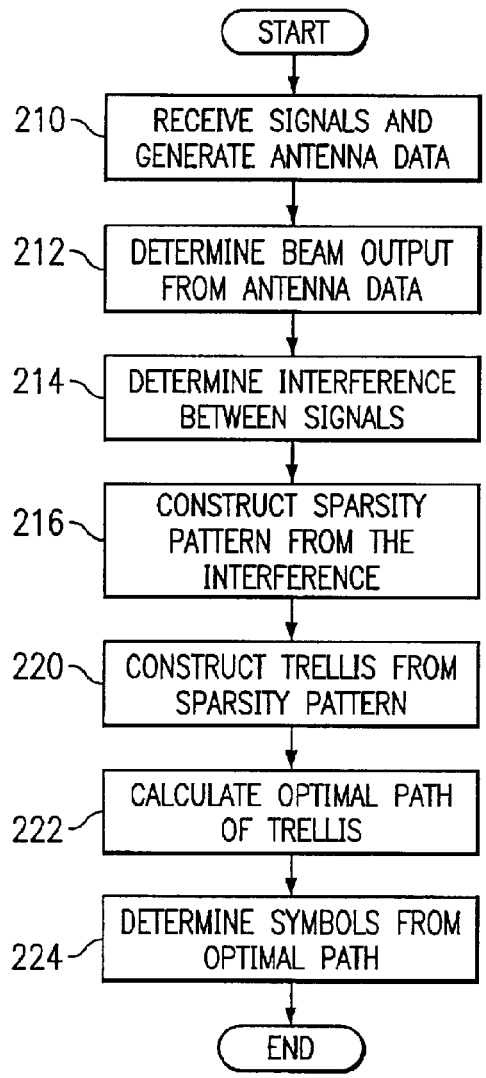
FIG. 6 is a flowchart illustrating a method for array processing.

FIG. 6 is a flowchart illustrating a method for array processing. The method generates a trellis that represents the possible symbol sets s[n] transmitted by signals $p_d$. A search is performed on the trellis in order to determine the symbol set s[n] that satisfies the maximum likelihood criterion as defined by Equation (3).

The method begins at step 210, where antenna elements 110 receive signals $p_d$ and output antenna data $x_m$. At step 212, beam former 120 determines beam output $y_d$ from antenna data $x_m$ using beam former matrix W as defined by Equation (8). FIG. 2 illustrates beams described by beam outputs $y_d$. At step 214, the interference between beams is determined. Interference module 122 determines the interference by applying matrix H as defined by Equation (5) to beam output $y_d$. Interference diagram 150 of FIG. 3 illustrates the interference among beams. At step 216, sparsity pattern 152 of FIG. 4 is constructed from interference matrix H. Sparsity pattern 152 represents the dominant signals.

A trellis is constructed using from sparsity pattern 152 at step 220. A method for constructing a trellis is described in connection with FIG. 7.

Figure 7:
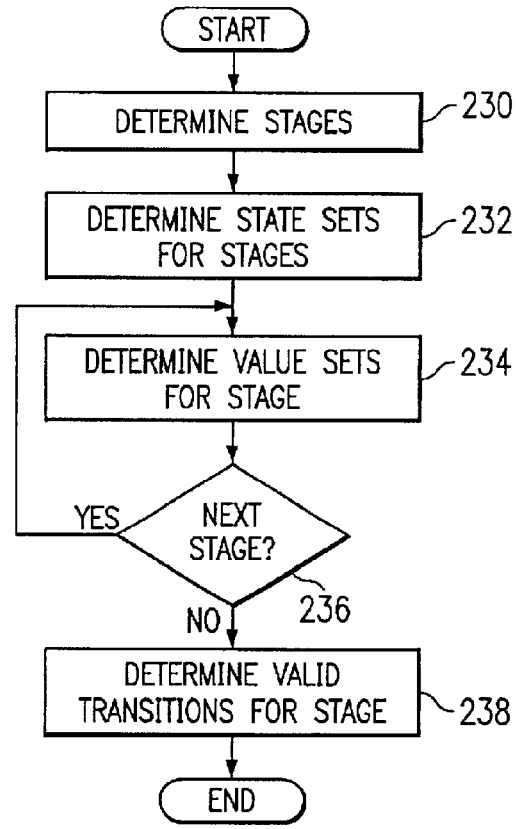
FIG. 7 is a flowchart illustrating a method for constructing the trellis of FIG. 5 from the sparsity pattern of FIG. 4.

FIG. 7 is a flowchart illustrating a method for constructing trellis 160 from sparsity pattern 152. The method begins at step 230 to determine stages 162 of trellis 160. A stage 162 represents a signal affected by interfering signals, and corresponds to a row of sparsity pattern 152. Stages 1, 2, ..., 8 represent signals $p_1, p_2, ..., p_8$, respectively, affected by interference from interfering signals.

At step 232, state sets 164 for stages 162 are determined. A state set 164 for a stage 162 (see FIG. 5) represents selected dominant signals interfering with the signal represented by the stage 162. State sets 164 are selected from the dominant signal sets U of sparsity pattern 152. If the dominant signal sets U of sparsity pattern 152 satisfy $U_e[d] \subseteq U_e[d-1] \cup U_e[d+1]$ with modulo-D indexing, the resulting trellis 160 is called a "tail-biting trellis." State sets o[d] for the dth state may be determined from the dominant signal sets U using Equation (10):

$$o[d] = \{s_u | u \in U[d-1] \cap U[d]\} \quad (10)$$

That is, the dth stage of trellis 160, is described by Equation (11):

$$o[d] \cup o[d+1] = (U[d-1] \cap U[d]) \cup (U[d] \cap U[d+1]) = U[d] \quad (11)$$

For example, state set $(s_8, s_1)$ is determined for stage 1. At step 234, value sets 166 for a stage 162 are determined. Value sets 166 of stage 162 include all possible values that the signals, or states, of a state set of the stage 162 may have. For example, values (1,1), (−1,1), (1,−1), and (−1,−1) are determined for state $(s_8, s_1)$.

At step 236, the method determines whether there is a next stage. If there is a next stage, the method returns to step 234 to determine the value sets for the stage. If there is no next stage, the method proceeds to step 238 to determine the valid transitions for a stage. Valid transitions are transitions between stages for which the corresponding states have the same value. For example, a transition from state set $(s_8, s_1)$ with values (1,1) to state sets $(s_1, s_2, s_3)$ with values (1,1,1) is valid, because state $s_1$ has the same value 1 at both stages. The transition from state set $(s_8, s_1)$ with values (1,1) to state set $(s_1, s_2, s_3)$ with values (−1,1,1) is not valid because $s_1$ has value 1 at stage 1 and value −1 at stage 2. After determining the valid transitions, the method terminates.

Returning to FIG. 6, at step 222, an optimal path of trellis 160 is calculated. The optimal path is the least cost path for the cost function defined by Equation (7). A method for calculating the optimal path is described in connection with FIG. 8.

Figure 8:
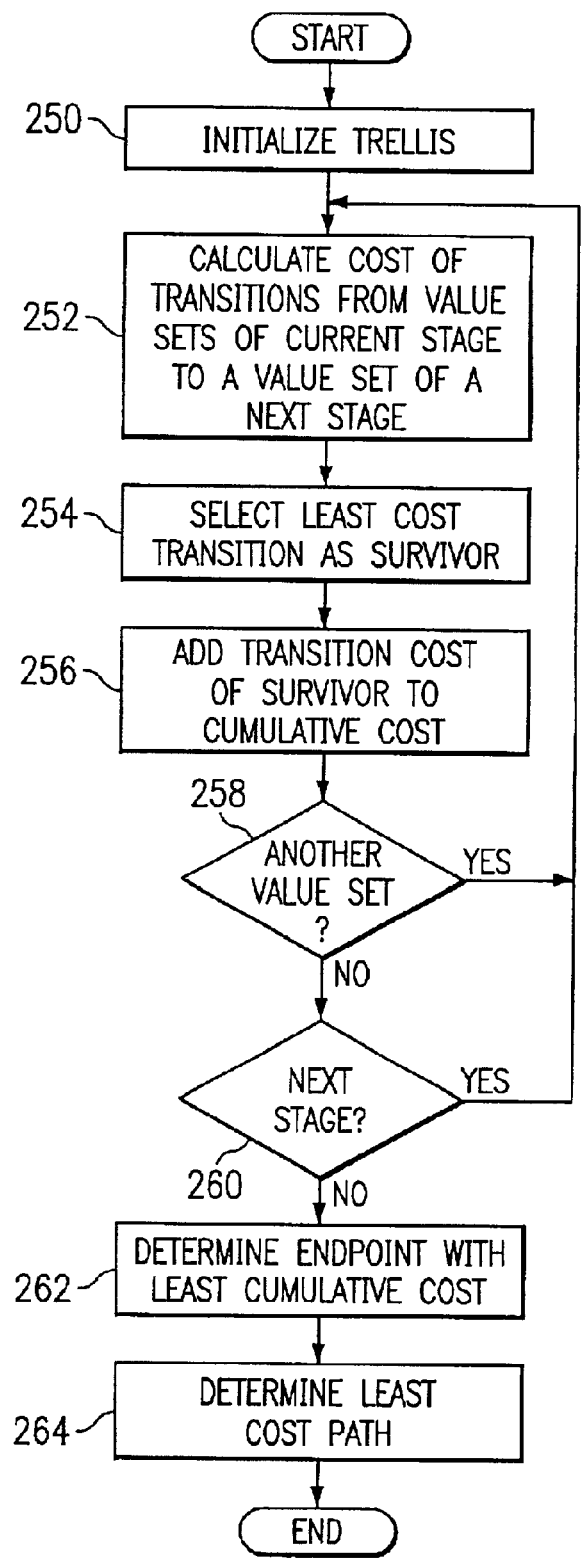
FIG. 8 is a flow chart illustrating one method for determining an optimal path of the trellis of FIG. 5.

FIG. 8 is a flow chart illustrating one method for determining an optimal path of trellis 160. The method selects an optimal path by calculating a cumulative cost for each path through the stages of trellis 160.

The method begins at step 250, where trellis 160 is initialized. Trellis 160 is initialized by selecting a starting stage as a current stage, for example, stage 1, and setting the cumulative costs for all value sets at zero. At step 452, the costs of transitions from value sets of the current stage to one value set of a next stage are calculated using Equation (7). For example, the costs of transitions from (1,1) at stage 1 to (1,1,1) at stage 2 and from (−1,1) at stage 1 to (−1,1,1) at stage 2 are calculated. The least cost transition is selected as a survivor at step 254. For example, the transition from (−1,1) to (1,1,1) is selected as the survivor. At step 256, the transition cost of the survivor is added to the cumulative cost of the value set at the next stage. For example, the transition cost is added to the cumulative cost of (1,1,1) at stage 2.

At step 258, the method determines whether there is another value set of the next stage. If there is another value set, the method returns to step 252 in order to calculate the cost of the transitions from the value sets of the current stage to the value set of the next stage. For example, the costs of the transitions from (1,1) to (−1,1,1) and from (−1,−1) to (−1,1,1) are calculated.

If there is not another value set at step 258, the method proceeds to step 260 to determine whether there is a next stage. Since trellis 160 is a tail-biting trellis, the method may proceed around the trellis through any number of stages. For example, the method may process stages 1 through 8, and then process stages 1 through 8 again. As more stages are processed, the accuracy of the search increases. The number of stages to be processed may be determined according to the desired accuracy and available computational power and time. If there is a next stage, the method returns to step 252 to calculate the transition costs at the next stage. If there is no next stage at step 260, the method proceeds to step 262 to determine the least cumulative cost. For example, a path ending at stage 8 with an endpoint value set (1,−1) has the least cumulative cost.

The least cost path is determined at step 264. The least cost path is determined by tracing back from the endpoint value set with the least cumulative cost through the survivors. For example, a path with value sets for stages 1 through 8 is represented by [(1,1) (1,−1,1) (1,1) (1,−1) (−1,1) (1,1,−) (1,−1) (−1,1) (1,−1)]. After determining the least cost path, the method terminates.

Returning to FIG. 6, the symbols are determined from the least cost path at step 224. The least cost path lists the symbols of the symbol set, for example, [(1,1) (1,−1,1) (1,1) (1,−1) (−1,1) (1,1,−1) (1,−1) (−1,1) (1,−1)]. Thus, the method identifies a symbol set that satisfies the maximum likelihood criterion as defined by Equation (3). After determining the symbols, the method terminates.

Certain embodiments of the invention may provide numerous technical advantages. A technical advantage of one embodiment is that a trellis is used to describe possible symbol sets transmitted by spatially diverse signals. The trellis is searched to efficiently identify an optimal symbol set. Another technical advantage of one embodiment is that a sparsity pattern is used to identify signals that produce dominant interference and to eliminate the rest of the signals. The sparsity pattern reduces the complexity of the array processing, thus decreasing computational time and power. Another technical advantage of one embodiment is that an efficient search process is used to locate a least cost path of the trellis. The least cost path identifies an optimal symbol set.

Although an embodiment of the invention and its advantages are described in detail, a person skilled in the art could make various alterations, additions, and omissions without departing from the spirit and scope of the present invention as defined by the appended claims.

What is claimed is:

1. A method for array processing, the method comprising:
   receiving a plurality of signals transmitting a symbol set;
   determining a dominant signal set for each signal, the dominant signal set for a signal comprising a set of dominant signals that interfere with the signal;
   constructing a trellis from the dominant signal sets, the trellis comprising a plurality of paths, each path representing a possible symbol set;
   selecting an optimal path from the trellis; and
   determining the symbol set represented by the optimal path.

2. The method of claim 1, wherein determining the dominant signal set for each signal comprises:
   determining energy that each signal receives from the other signals;
   constructing a sparsity pattern from the energy; and
   selecting the dominant signal sets from the sparsity pattern.

3. The method of claim 1, wherein constructing the trellis from the dominant signal sets comprises:
   associating a stage of the trellis with each signal;
   selecting a state set for each stage, the state set selected from the dominant signal set of the signal associated with the stage;
   determining a plurality of value sets for each state set, each value set comprising a set of values for the state set; and
   determining a plurality of transitions between the value sets, the paths of the trellis comprising at least some of the transitions.

4. The method of claim 1, wherein constructing the trellis from the dominant signal sets comprises:
   associating a state set with each signal, the state set selected from the dominant signal set of the signal;
   determining a value set for each state set, the value set comprising a set of values for the state set; and
   determining the paths of the trellis from the value sets.

5. The method of claim 1, wherein selecting the optimal path from the trellis comprises determining an optimal path according to an approximation of a maximum likelihood criterion.

6. The method of claim 1, wherein selecting the optimal path from the trellis comprises:
   associating each path with a cumulative cost; and
   determining the path with the lowest cumulative cost.

7. The method of claim 1, wherein:
   each path of the trellis comprises a plurality of transitions; and
   selecting the optimal path from the trellis comprises:
      calculating a transition cost for each transition; and
      determining the path comprising the transitions with the lowest total transition cost.

8. A method for array processing, the method comprising:
   receiving a plurality of signals transmitting a symbol set;
   determining a dominant signal set for each signal, the dominant signal set for a signal comprising a set of dominant signals that interfere with the signal;
   constructing a trellis from the dominant signal sets, comprising:
      constructing a plurality of paths, each path representing a possible symbol set;
      constructing a plurality of stages, each stage corresponding to a signal;
      constructing a plurality of value sets associated with each stage; and
      constructing a plurality of transitions, each transition going from a current value set to a next value set, each path of the trellis comprising at least some of the transitions;
   selecting an optimal path from the trellis; and
   determining the symbol set represented by the optimal path.

9. The method of claim 8, wherein selecting the optimal path from the trellis comprises:
   determining a set of survivor transitions for each stage;
   calculating a transition cost for each survivor transition;
   adding the transition cost of each survivor transition to a cumulative cost associated with the survivor transition; and
   determining the optimal path from a survivor transition of a last stage corresponding to the lowest cumulative cost.

10. The method of claim 8, wherein selecting the optimal path from the trellis comprises:
    determining a set of survivor transitions for each stage by:
       calculating a transition cost for each transition from the value sets of a current stage to a value set of a next stage;
       determining a survivor transition with the lowest transition cost;
    adding the transition cost of each survivor transition to a cumulative cost associated with the survivor transition; and
    determining the optimal path from a survivor transition of a last stage corresponding to the lowest cumulative cost.

11. A system for array processing, the system comprising:
    a plurality of antenna elements receiving a plurality of signals transmitting a symbol set;
    a module set coupled to the antenna elements, the module set:
       determining a dominant signal set for each signal, the dominant signal set for a signal comprising a set of dominant signals that interfere with the signal;
       constructing a trellis from the dominant signal sets, the trellis comprising a plurality of paths, each path representing a possible symbol set;
       selecting an optimal path from the trellis; and
       determining the symbol set represented by the optimal path.

12. The system of claim 11, wherein the module set determines the dominant signal set for each signal by:
   determining energy that each signal receives from the other signals;
   constructing a sparsity pattern from the energy; and
   selecting the dominant signal sets from the sparsity pattern.

13. The system of claim 11, wherein the module set constructs the trellis from the dominant signal sets by:
   associating a stage of the trellis with each signal;
   selecting a state set for each stage, the state set selected from the dominant signal set of the signal associated with the stage;
   determining a plurality of value sets for each state set, each value set comprising a set of values for the state set; and
   determining a plurality of transitions between the value sets, the paths of the trellis comprising at least some of the transitions.

14. The system of claim 11, wherein the module set constructs the trellis from the dominant signal sets by:
   associating a state set with each signal, the state set selected from the dominant signal set of the signal;
   determining a value set for each state set, the value set comprising a set of values for the state set; and
   determining the paths of the trellis from the value sets.

15. The system of claim 11, wherein the module set selects the optimal path from the trellis by determining an optimal path according to an approximation of a maximum likelihood criterion.

16. The system of claim 11, wherein the module set selects the optimal path from the trellis by:
   associating each path with a cumulative cost; and
   determining the path with the lowest cumulative cost.

17. The system of claim 11, wherein:
   each path of the trellis comprises a plurality of transitions; and
   the module set selects the optimal path from the trellis by:
      calculating a transition cost for each transition; and
      determining the path comprising the transitions with the lowest total transition cost.

18. A system for array processing, the system comprising:
   a plurality of antenna elements receiving a plurality of signals transmitting a symbol set;
   a module set coupled to the antenna elements, the module set:
      determining a dominant signal set for each signal, the dominant signal set for a signal comprising a set of dominant signals that interfere with the signal;
      constructing a trellis from the dominant signal sets, the trellis comprising:
         a plurality of paths, each path representing a possible symbol set;
         a plurality of stages, each stage corresponding to a signal;
         a plurality of value sets associated with each stage; and
         a plurality of transitions, each transition going from a current value set to a next value set, each path of the trellis comprising at least some of the transitions;
      selecting an optimal path from the trellis; and
      determining the symbol set represented by the optimal path.

19. The system of claim 18, wherein the module set selects the optimal path from the trellis by:
   determining a set of survivor transitions for each stage;
   calculating a transition cost for each survivor transition;
   adding the transition cost of each survivor transition to a cumulative cost associated with the survivor transition; and
   determining the optimal path from a survivor transition of a last stage corresponding to the lowest cumulative cost.

20. The system of claim 18, wherein the module set selects the optimal path from the trellis by:
   determining a set of survivor transitions for each stage by:
      calculating a transition cost for each transition from the value sets of a current stage to a value set of a next stage;
      determining a survivor transition with the lowest transition cost;
   adding the transition cost of each survivor transition to a cumulative cost associated with the survivor transition; and
   determining the optimal path from a survivor transition of a last stage corresponding to the lowest cumulative cost.

21. A method for array processing, the method comprising:
   receiving a plurality of signals transmitting a symbol set;
   determining a dominant signal set for each signal by:
      determining energy that each signal receives from the other signals;
      constructing a sparsity pattern from the energy; and
      selecting the dominant signal sets from the sparsity pattern;
   constructing a trellis comprising a plurality of paths from the dominant signal sets by:
      associating a state set with each signal, the state set selected from the dominant signal set of the signal;
      determining a value set for each state set, the value set comprising a set of values for the state set; and
      determining the paths of the trellis from the value sets, each path representing a possible symbol set;
   selecting an optimal path from the trellis by:
      determining a set of survivor transitions for each stage;
      calculating a transition cost for each survivor transition;
      adding the transition cost of each survivor transition to a cumulative cost associated with the survivor transition; and
      determining the optimal path from a survivor transition of a last stage corresponding to the lowest cumulative cost; and
   determining the symbol set represented by the optimal path.

* * * * *

UNITED STATES PATENT AND TRADEMARK OFFICE
CERTIFICATE OF CORRECTION

PATENT NO. : 6,868,133 B2
APPLICATION NO. : 09/858316
DATED : March 15, 2005
INVENTOR(S) : Hicks et al.

It is certified that error appears in the above-identified patent and that said Letters Patent is hereby corrected as shown below:

Column 2, Line 34, after "$p_2, ...,$", delete "$p_D$", and insert -- $p_d$ --.
Column 3, Line 21, after "$\{\underline{s}^H A^H$", delete "$\Phi_{zz}^{-1}$", and insert -- $\Phi_{\underline{zz}}^{-1}$ --.
Column 3, Line 21, after "$2Re\{($", delete "$\Phi_{zz}^{-1}$", and insert -- $\Phi_{\underline{zz}}^{-1}$ --.

Column 3, Lines 45-47, after "min" delete "$\sum_{d=1}^{Ds}$", and insert -- $\sum_{d=1}^{Du}$ --.

Column 6, Line 57, after "(-1,1)", delete "(1, 1, -)", and insert -- (1, 1, -1) --.

Signed and Sealed this

Thirteenth Day of February, 2007

JON W. DUDAS
*Director of the United States Patent and Trademark Office*